Aug. 29, 1933.   F. S. HODGMAN   1,924,857
WIRELESS CONTROLLED AUTOMATIC PILOT
Filed Dec. 10, 1931   2 Sheets-Sheet 1

INVENTOR
FREDERICK S. HODGMAN.
BY
his ATTORNEY.

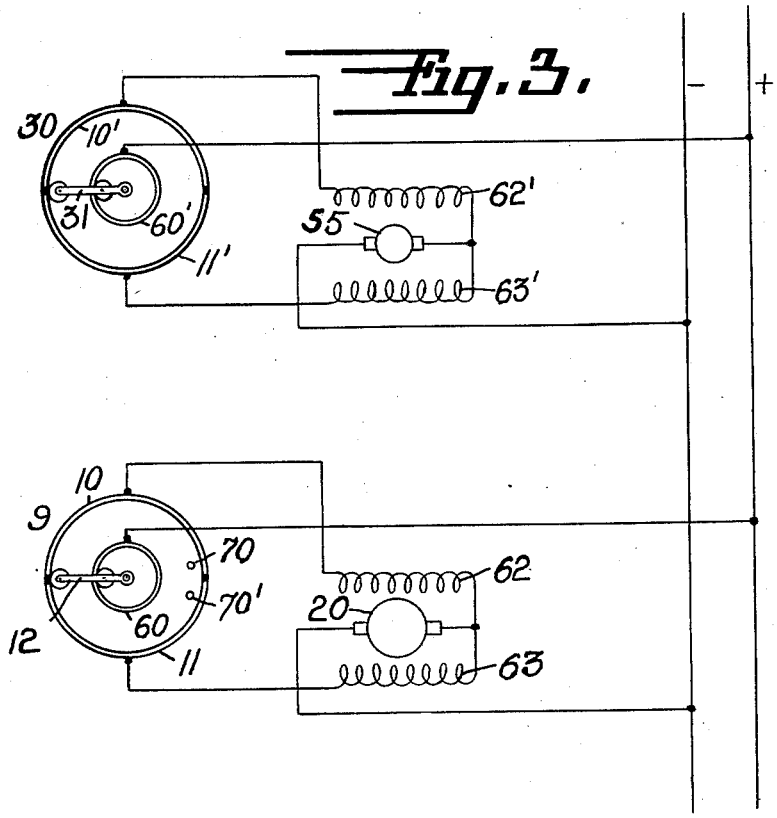

Patented Aug. 29, 1933

1,924,857

UNITED STATES PATENT OFFICE 1,924,857

WIRELESS CONTROLLED AUTOMATIC PILOT

Frederick S. Hodgman, Glen Rock, N. J., assignor to Sperry Gyroscope Company, Inc., Brooklyn, N. Y., a corporation of New York Application December 10, 1931
Serial No. 580,044

4 Claims. (Cl. 172—282)

This invention relates to the remote control of dirigible vessels, such as ships, and more especially to the remote control of the steering thereof. Automatic steering of ships from gyroscopic compass baselines (the gyro-pilot) is now common practice and one object of the present invention is to devise a remote control which may be readily placed on a ship already equipped with such an automatic steering gear but without any one on board for steering the same from the shore or another ship. According to the present invention an impulse step-by-step system of radio control is employed wherein one signal of predetermined characteristics will cause the ship to turn a predetermined amount, say 5 degrees, while if the signal is repeated, say ten times in succession, the course will be changed 50 degrees. By using a signal of different characteristics, for example of different wave length, a course change in the opposite direction may be effected in a similar manner. Such large course changes could not be effected in the average gyro-pilot and it is one object of the present invention to adapt the gyro-pilot to making any predetermined course change without losing synchronism with the ship.

Referring to the drawings illustrating my invention in diagrammatic form,

Fig. 3 is an elementary wiring diagram of the motor control circuits in the automatic steering unit, but not including the wireless circuits which are shown in Fig. 1.

Figure 1:
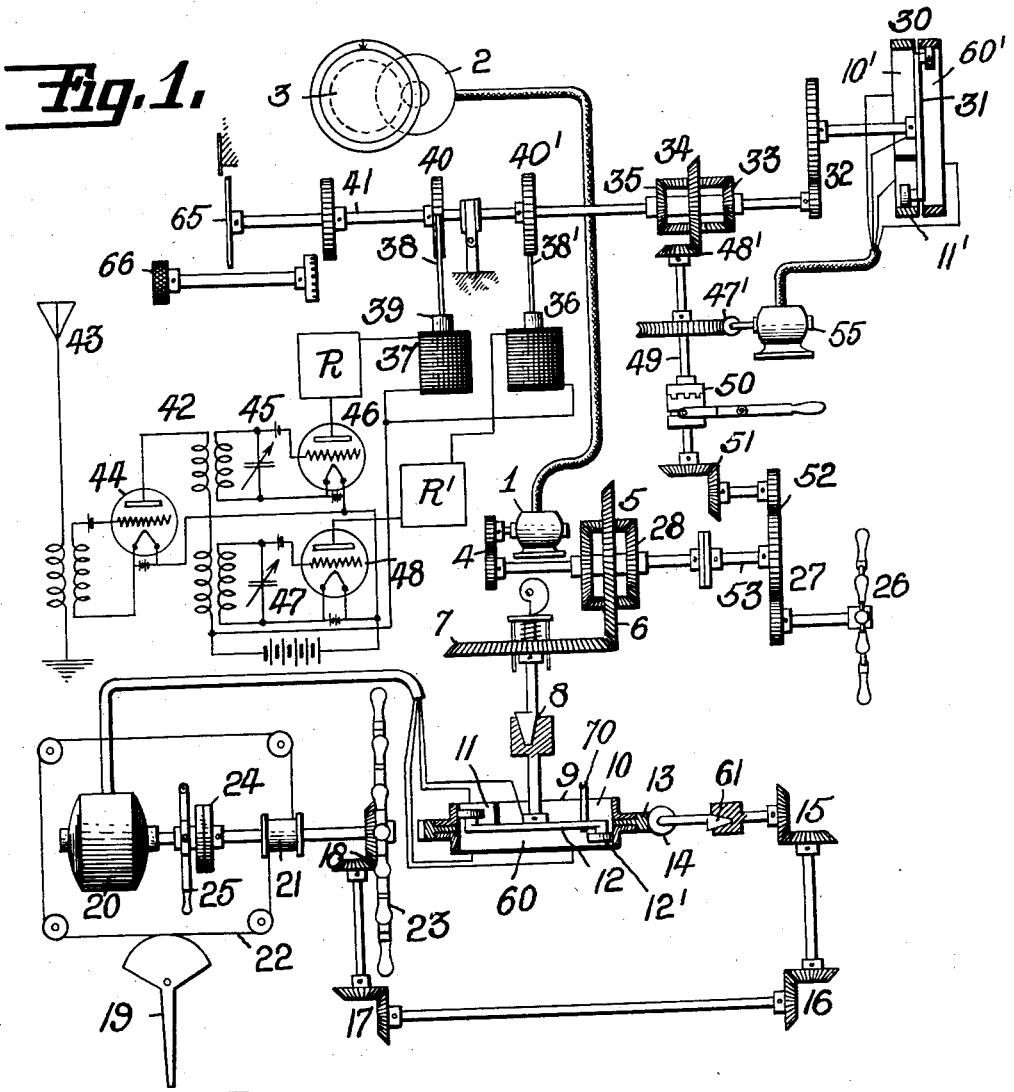
Fig. 1 is a diagram showing how the wireless controlled impulses are utilized in an automatic steering gear for purposes of remote control.

Referring to Fig. 1, the parts of a standard automatic steering gear will be recognized in the drawings as follows:

The course-controlling repeater motor is shown at 1, said motor being actuated as usual from a transmitter 2 on a gyroscopic or other compass 3. The repeater motor actuates through gearing 4 one side of a differential 5 to turn the planetary bevel gear 6, which in turn turns the bevel gear 7 driving through the usual lost motion 8 the main controller 9. Said controller is shown as comprising the usual reversing contacts 10 and 11 and trolley arm 12 (see also Fig. 3), having thereon a lower trolley 12' bearing on collector ring 60. As is usual in such controllers the trolley arm is geared to rotate several times as fast as the ship turns so that an accurate control is effected. The usual follow-up is provided by mounting the rings 10—11 in a rotatable gear 13 which is turned from a worm 14 through suitable gearing 15—16—17 and 18 and lost motion 61 from the rudder 19 and steering motor 20. Said motor may be of any type and is shown as actuated either directly or indirectly from the aforesaid reversing contacts 10 and 11 through opposed field windings 62—63 and may operate the rudder through a drum 21 and steering cables 22. A large handwheel 23 may be provided for direct steering, if desired, at which time the clutch 24 is thrown out by handle 25. Course changing is also manually effected through the main controller by a small handwheel 26 which turns through gearing 27 the third side 28 of the differential 5. Said handwheel should not be turned too fast, however, or it will reverse the controller. To prevent this stop pins 70, 70' may be provided to prevent the trolley 12 from recrossing the lower insulation strip between 10 and 11.

Figure 2:
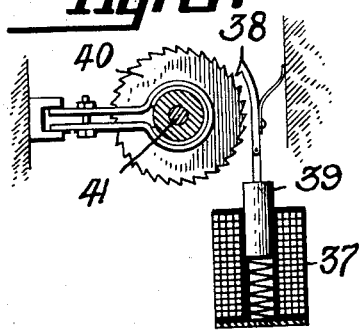
Fig. 2 is a detailed view of one of the wireless controlled ratchets for changing course.

In order to control such a gear by radio, I prefer to employ an auxiliary controller 30 which preferably has a one to one relation to the movements of the ship controlled thereby instead of being geared up as is controller 9. In other words, a 5 degree movement say, of the trolley arm 31 over reversing contacts 10', 11', will cause a 5 degree turn of the ship, a 10 degree movement, a 10 degree turn of the ship, etc. Such a controller is usually referred to as a coarse controller, in contradistinction to the fine controller 9. The trolley arm is shown as turned through suitable gearing 32 from one side 33 of differential gear 34. The opposite side 35 is turned from radio-controlled solenoids 36—37. The armature 39 of each solenoid is provided with a ratchet 38—38' cooperating with a ratchet wheel 40—40' on the shaft 41 of gear 35. The two ratchet wheels have oppositely directed teeth and the ratchet 38 is shown above and the ratchet 38' below the respective ratchet wheels. It will readily be seen, therefore, that upon excitation of the solenoid 37, for instance, the ratchet wheel 40 will be turned clockwise in Fig. 2 through a predetermined number of teeth, while if solenoid 36 is excited the ratchet wheel 40' will be turned in the opposite direction, preferably the same number of teeth. The angle through which the shaft is turned may be shown on dial 65, which may be set by knob 66 in synchronizing. The solenoids are controlled from a suitable wireless receiving set 42, the antenna being represented at 43 and the detector tube at 44. One oscillatory tuning circuit 45 coupled to the output of the tube 44 is tuned for a predetermined frequency so that when such frequency is received the solenoid 37 is excited through the output of the tube 46 as amplified through any suitable amplifier R. Similarly for a different predetermined frequency the oscillatory circuit 47 is energized and the output of the tube 48 thereof excites the solenoid 36 through a suitable amplifier R'. At the sending station two buttons (not shown) are provided, one for turning right and the other for turning left, and one sending out a signal of a frequency to energize the solenoid 37 and the other of a frequency to energize the solenoid 36. One push of a given button will, therefore, move the ratchet through a predetermined number of degrees or fractions thereof; two successive pushes to twice that number of degrees, etc. Therefore, the trolley 31 will be turned in one direction or the other through an angle proportional to the number of successive impulses sent out. This angle may be any where from zero to 360 degrees although in practice 180° would probably be the maximum angle sent out. Since, however, the controller 30 has a one to one relation to the movements of the ship controlled thereby, synchronism will not be lost regardless of the number of impulses sent or their rapidity.

The controller 30 controls the slow speed reversing motor 55 through circuits similar to the circuits by which the motor 20 is controlled. Said motor has a follow-back connection to controller 30 as by coupling the motor to the third arm of the differential 34 through suitable reduction gearing 47' and 48'. The main function of motor 55 is to provide a power means for turning the main controller 9, which never loses synchronism with the sending instrument. The motor is shown as turning controller 9 through a clutch 50 on shaft 49 and reduction gearing 51—52 which connects said motor to the shaft 53 which is turned from the handwheel 26. The reduction gearing is so designed with respect to the speed of motor 55 that controller 9 is never turned fast enough to cause trolley 12 to strike the stops 70. In other words, the rate at which the controller is turned is regulated not to exceed the rate at which the ship answers the rudder. This may be accomplished by varying the speed of the motor 55, or the ratio of the gearing 47', to suit the turning rate of the ship. This rate may be from 2 to 10 minutes, depending upon the turning characteristics of the ship. The radio control means is shown as coming in to the automatic steering gear through the normal course changing wheel thereon so that the radio control device may be coupled to the standard automatic steering gear on a ship having the latter.

In accordance with the provisions of the patent statutes, I have herein described the principle and operation of my invention, together with the apparatus which I now consider to represent the best embodiment thereon, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a radio-controlled means for automatically steered ships, the combination with the automatic steering gear including a master controller and a course changing device, of remotely controlled power means for turning said device including an auxiliary controller, radio controlled means for turning the same through the angle by which the course is to be changed, and a power motor driven thereby for turning said course changing device.

2. In a radio-controlled means for automatically steered ships, the combination with the automatic steering gear including a master controller and a course changing device, of remotely controlled power means for turning said device including an auxiliary controller, radio controlled impulse means for turning the same through the angle by which the course is to be changed, and a power motor driven thereby for turning said course changing device at a speed not greater than the ship is capable of following.

3. In a radio controlled means for automatically steered ships, the combination with the automatic steering gear including a master compass, a master controller actuated therefrom and a course changing device, of radio actuated two-way selective means, an auxiliary controller adapted to be turned in either direction by said selective means, a slow speed motor actuated thereby for turning said course changing device and thereby turning said master controller at a speed not greater than the ship is capable of turning, a follow-back from said motor to said auxiliary controller, and a power means actuated from the master controller for turning the rudder.

4. In a radio-controlled means for steering ships from a distance, a radio-governed 360 degree synchronous coarse controller, a compass-governed fine controller, wireless controlled means for turning the coarse controller through a desired angle of turn, a power motor actuated thereby for shifting the compass-governed controller, and power means actuated by the compass governed controller for turning the ship's rudder.

FREDERICK S. HODGMAN.